Patented May 30, 1933

1,911,479

UNITED STATES PATENT OFFICE

CHARLES J. STROSACKER AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

FLAKE SODIUM ACETATE

No Drawing. Application filed September 23, 1931. Serial No. 564,722.

The present invention relates to an improved form of sodium acetate, namely, a flaked form of the salt, which is better adapted for handling, packaging and storing than the usual crystal form thereof.

It is well known that sodium acetate may be obtained in two crystalline forms, one being anhydrous and the other containing 3 molecules of water of crystallization. The trihydrate has a transition point at 58° C., at which temperature the hydrated salt partially melts in its own water of crystallization to form a mixture of solution and solid, the latter phase consisting of the anhydrous salt. In the crystallization of sodium acetate from aqueous solutions, therefore, hydrated crystals are produced at temperatures below 58° C., and anhydrous crystals above that temperature.

There are certain disadvantages in preparing the salt in crystal form according to the usual crystallization methods. When the hydrated crystals are prepared and separated from the mother liquor, a more or less moist mass of crystals is formed which packs down and tends to solidify in storage into a solid cake. To dry the crystals on the surface at the comparatively low temperature required to avoid fusion of the same is a tedious and time-consuming operation, not well adapted for large scale commercial production. On the other hand, if it is attempted to produce anhydrous crystals directly, it is necessary to work with hot concentrated solutions which solidify completely if allowed to cool to 58° C., while the crystals obtained in the form of thin scales mat together quickly on a filter surface and prevent the mother liquor from passing through, so that it is practically impossible to filter them by any usual means.

We have now found that all of the aforesaid difficulties and disadvantages may be obviated by flaking the fused salt, whereby a free-flowing sub-divided form of product is obtained which is convenient to handle and does not cake in the package under usual storage conditions. Following is a clear and concise description of one method of preparing the improved flaked sodium acetate product constituting our invention, such disclosed procedure illustrating but one of the various ways in which the principle of the invention may be employed.

The sodium acetate in the form of an aqueous solution of any convenient strength is concentrated until the boiling point rises to between 110° and 120° C. at atmospheric pressure. The hot solution is then run into the pan of a mechanical flaking apparatus of the usual type well known in the art, in which it is contacted with the surface of a slowly revolving internally cooled drum or the equivalent thereof. A film of the salt is taken up by the drum surface and quickly chilled to solidification, and then, as the drum continues through its revolution, the solid film is scraped off in the form of flakes by a scraper knife. The solution in the pan is preferably to be maintained at a temperature between 100° and 110° C.; otherwise, if the solution is allowed to cool further, a separation of anhydrous sodium acetate crystals occurs, which crystals tend to float on the solution and interfere with the formation of a uniform film on the drum surface. The drum is preferably to be revolved at a peripheral speed of about 10 to 25 feet per minute, and the cooling water is to be supplied thereto at a temperature and in sufficient amount so that the flakes discharged from the drum are at a temperature between about 45° and 55° C. Under the conditions prescribed the capacity of the flaking apparatus will be approximately between 20 and 30 pounds per square foot per hour of a product containing 60 to 62 per cent anhydrous sodium acetate, i. e. corresponding closely to the composition of the trihydrate, $CH_3COONa \cdot 3H_2O$. Likewise, a partially hydrated product having any desired content of anhydrous sodium acetate in excess of about 60 per cent thereof may be prepared similarly by flaking a more concentrated molten material at a suitably elevated temperature. The operation may be carried out in iron or steel apparatus without material discoloration of the product.

By proceeding in the manner herein described a sensibly dry, free-flowing flaked product is prepared which does not coalesce or cake in storage if protected from water and temperatures exceeding about 55° C. Under usual storage conditions the product may be packaged in paper or fabric bags, boxes or cartons without deterioration, whereas the moist crystals formerly constituting the commercial form of the salt required wood barrels or steel drums for shipping containers. The preparation of a flaked product has the further advantages of saving materially in labor expense and in economizing space for the apparatus, permitting a greatly increased output per man and per unit of floor space.

Other modes of applying the principle of our invention may be employed instead of those explained, change being made as regards the process herein disclosed, provided the product as stated by any of the following claims or the equivalent of such stated product be thereby obtained.

We therefore particularly point out and distinctly claim as our invention:—

1. Sodium acetate in the form of small thin flakes.

2. Sodium acetate in the form of small thin flakes containing 60 to 62 per cent anhydrous sodium acetate and corresponding in composition approximately to the trihydrated salt, $CH_3COONa \cdot 3H_2O$.

3. Partially hydrated sodium acetate in the form of small thin flakes containing in excess of 60 per cent anhydrous sodium acetate.

Signed by us this 19th day of September, 1931.

CHARLES J. STROSACKER.
SHELDON B. HEATH.